United States Patent Office 3,553,067
Patented Jan. 5, 1971

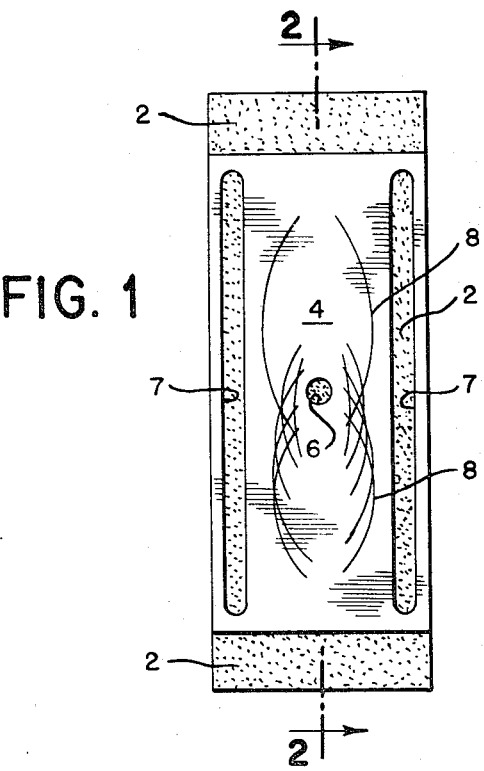
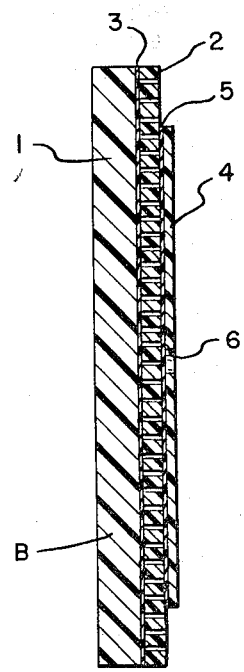
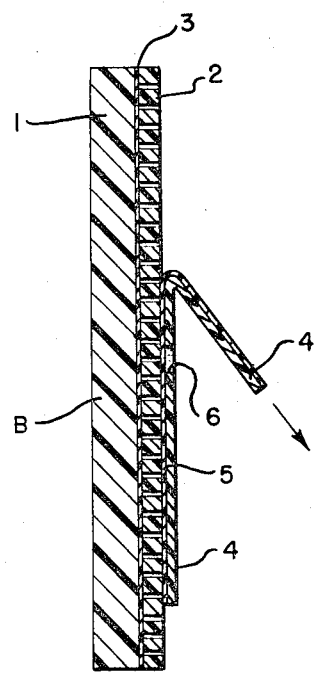

3,553,067
LAMINATED SHEET FOR EVALUATING
DIFFUSIVE REACTIONS
James L. Dwyer, Lincoln, Richard A. Paine, Bedford, and Charles W. Souza, Pinehurst, Mass., assignors to Millipore Corporation, Bedford, Mass., a corporation of Massachusetts
Continuation-in-part of application Ser. No. 626,323, Mar. 27, 1967. This application Mar. 25, 1968, Ser. No. 715,647
Int. Cl. B01d 13/02; B32b 3/10, 5/18
U.S. Cl. 161—113                                         10 Claims

ABSTRACT OF THE DISCLOSURE

A laminated sheet consisting of a base sheet of stiff but flexible plastic, a porous plastic membrane sheet which has a multiplicity of micro-pores bonded to the base sheet, and a thin imperable plastic sheet similarly bonded to the other side of the porous plastic sheet.

CROSS-REFERENCE TO RELATED APPLICATION

This application is a continuation-in-part of our application, Ser. No. 626,323, filed Mar. 27, 1967.

BACKGROUND OF INVENTION

Various types of porous sheets have been used for electrophoretic analyses such as paper and microporous plastic sheets of such thin and flexible nature that they require support. Such sheets are difficult to use and of uncertain stability for maintaining records. Various gels supported on glass plates or the like are commonly used for immuno methods. Electrophoretic migration and diffusion can take place in material such as starch, gels, agar gels and acrylamide gels. Disadvantages in the use of such materials include care in their preparation, avoidance of drying the gel, slow diffusion and formation of precipitin arcs, difficult washing of unreacted material and staining.

The invention of said application, Ser. No. 626,323 provides a laminated sheet consisting of a plastic base sheet to which is bonded a microporous plastic membrane sheet. The membrane sheet consists largely of pores, which are open on the outer surface for receiving electrolyte solution and the material to be analyzed by electrophoresis.

The two-component laminated sheet of said patent application has been used for immunoelectrophoresis by pressing a perforated or slotted template sheet over the porous plastic membrane to provide a structure for the test evaluation. This requires carefully regulated even pressure to prevent damage to the plastic porous membrane and the required uniformity of diffusion. A practical limitation is that the laminate cannot be prepared, and stored dry for immediate use when experiments are to be performed.

SUMMARY OF INVENTION

The laminated sheet of the present invention is strong, durable, can be prepared in advance of use, stored or shipped for future use and gives technical advantages which will be described later.

Typical diffusive reactions which can be carried out effectively and efficiently with the laminated sheet include immunodiffusion, electrophoresis, immunoelectrophoresis, for example, in the analyses of serum.

Generally, the laminated sheet of the present invention includes a plastic base sheet and a membrane sheet bonded to one side of the base sheet as described in said application. In addition to these sheets, a thin flexible sheet is bonded to the other side of the membrane sheet. Thus, the porous plastic membrane is sandwiched between the base sheet and the thin flexible sheet. The thin flexible sheet has one or more holes or slits for the application to the porous plastic sheet of the chemicals to be evaluated. The bonding of the sheets together is effected with a thermoplastic adhesive without impairing the capillary transport of the liquids in the pores.

The base sheet is preferably a clear stiff but flexible plastic sheet having the requisite chemical stability to be inert to the chemicals being tested and which permits good bonding to the porous plastic membrane sheet. The porous membrane must have such critically proportioned pores that bonding of the base sheet and the thin plastic sheet can be effected without impairing the pores, and which have such surface characteristics as to permit diffusive fluid travel and also electrophoretic mobility.

The thin flexible plastic sheet is slotted or suitably provided with holes prior to bonding and performs a very important function. It restricts the diffusion of the liquids applied to the porous plastic membrane through the openings within the pores of the plastic membrane, most importantly it prevents drying of the liquids and can be removed to wash out unreacted chemicals so that the insoluble reacted chemicals can be evaluated. The plastic sheet is sufficiently thin that it can be peeled off the membrane sheet at such a sharp angle that the arc radius at the edge of release is so small that the severance is virtually along a line whereby the thin sheet can be removed without removing any appreciable amount of adhering porous plastic membrane.

The laminated sheet of the invention may be used in various electrophoretic apparatus. For example, said patent application describes and illustrates a device which may be used advantageously to employ the laminated sheet in electrophoretic analytical separation.

In a practice of immunodiffusion, a sample of patient's serum is placed on a porous matrix such as porous plastic membrane or a gel such as starch gel or agar gel. Nearby, a sample of horse anti-human serum prepared by standard techniques is applied. This preparation is then allowed to incubate in a moist environment for a suitable time period. The human serum and the horse antiserum start to diffuse away from their application points. In doing so, the human serum and horse anti-serum start to diffuse through each other. Where this happens, antigen-antibody precipitates are formed. If the preparation is now rinsed to remove the unreacted serum and antiserum and then stain with a protein stain, the antigen-antibody precipitate will be evident as a vivid line or series of lines lying between the two sample application points. The presence of these lines indicates to the immunologist that serum fractions responsive to the horse anti-serum are indeed present in the patient's serum sample.

By challenging a patient's serum sample the various strengths of a known anti-serum, one can quantitatively establish the amount of specific materials present in a sample. There are a number of variations of techniques and patterns of application employed in the art of immunodiffusion, and the interpretation of the resulting patterns. They all, however, rely on the fundamental mechanisms cited above.

When an anti-serum is produced in an animal, it should contain anti-bodies of every fraction that was present in the human serum injected into the animal. By the technique of electrophoresis, one can fractionate human serum into six or seven fractions at most. Each of the bands or fractions produced by electrophoresis, however, can contain a number of specific structures that happen to have the same electrophoretic mobility. By using the technique of immunoelectrophoresis, one can demonstrate the presence of many more discrete and individual fractions within the six or seven main fractions developed by electrophoresis.

Immunoelectrophoresis proceeds as follows: A spot of serum is applied to an electrophoretic medium and electrophoresed to separate the components. After electrophoresis, a band of anti-serum is applied close to the fractionated serum. The band is a straight line parallel to the direction of electrophoretic migration. Serum components and anti-serum are then allowed to migrate toward one another. The specific antibody in the anti-serum precipitates with each of the serum components that diffuse toward it. The result is a series of precipitin arcs lying between the original serum application spot and the anti-serum line. The presence or absence of any specific precipitin arc indicates the presence or absence of the corresponding fraction in the patient's serum sample. By spreading the serum components along the axis of electrophoretic migration, one separates the various components and thus allow a whole series of arcs to be individually visible after a single experiment. In immunodiffusion these arcs would tend to lie one on top of the other because serum and anti-serum both originated from point sources. Immunoelectrophoresis thus offers a good deal more information than simple immunodiffusion.

In both of these techniques, one requires a support medium which is (1) Passive to both serum and anti-serum;
(2) Allows free and uniform diffusive migration of all components;
(3) Can be washed free of unreacted components;
(4) Can be stained in one fashion or another such that the precipitin arcs will be visible to the analyst.

Irrespective of what substrate media is used, one must scrupulously avoid any evaporation of liquid during the diffusion stage of the technique. If water were to evaporate from the substrate, particularly in a non-uniform pattern (as it inevitably will), hydraulic flow of residual liquid would occur in the medium as the liquid tended to redistribute itself uniformly through the matrix. This hydraulic flow would distort the diffusion path of the components and the resulting precipitin lines would either be severely distorted or even obliterated. As a result, it is the present practice to incubate in saturated humidity chambers. One technique used with porous plastic membranes even involves taking the wet membrane strip after electrophoresis and application of the anti-serum and immersing this wet strip in an oil bath. The oil thus prevents evaporation of the liquid. Great care must be exercised to make sure that the strip is absolutely level in such an apparatus. The procedure is generally quite messy.

In the accompanying drawings:

FIG. 1 is a plan view of a laminated sheet of the invention proportioned as a strip ready for use;

FIG. 2 is an enlarged sectional view at 2—2 of FIG. 1, and

FIG. 3 is an enlarged sectional view of FIG. 1 showing the top thin flexible sheet in a partially removed condition.

DESCRIPTION OF THE PREFERRED EMBODIMENTS

The laminated sheet of the invention shown in the drawings comprises a clear plastic sheet B, a microporous plastic membrane sheet 2 bonded to the plastic sheet 1 with a thermoplastic adhesive 3 and a thin plastic sheet 4 which is also bonded to the membrane sheet 2 with a thermoplastic adhesive 5. The section is greatly enlarged, the pores being disproportionally enlarged, for the purpose of illustration.

The laminated sheet is preferably produced of the materials and by the technique as follows: The base sheet is a plastic material having the requisite physical and chemical properties. It is preferably clear and is stiff and resilient so that when used for electrophoresis in the device of said application it will hold the bowed position used in the device and may vary from about 6 to 12 mils, preferably 10 mils, thick. It must be a non-conductor of electricity under the conditions of use.

As for the chemical properties, the base sheet must be unaffected by the buffer solution used in the receptacle. Various plastic materials fulfill the above requirements such as a polyester (Mylar, the Du Pont 1000D) being especially effective, a polyamide, or polycarbonates.

The microporous plastic membrane sheet 2 may be formed of a mixture of cellulose nitrate and cellulose acetate or entirely of cellulose acetate according to the Zsigmondy U.S. Pat. 1,421,341 or the Cotton U.S. Pat. 2,944,017. The sheet is preferably formed of cellulose acetate. An effective sheet is about 5 mil thick and has average pore sizes varying from 0.5 to 1.5 microns. In electrophoresis testing the sheet transports the buffer solution by capillary action and enables the electrophoretic transport to take place.

The bonding or adhesive material 3 must also meet rather critical specifications. The adhesive is advantageously a thermoplastic material, preferably one that does not require a catalyst or a curing agent and has a sealing temperature below the heat distortion point of the porous plastic membrane sheet 2. A Du Pont material known as a modified synthetic rubber adhesive (Du Pont 56016) has been found to be very effective.

The thickness of the finished dry coat of adhesive deposited on the base sheet must be within close limits. Optimum thickness range is 0.25 to 0.35 mil. If less than 0.25 mil is applied to the base sheet the amount is insufficient to bond to the porous membrane sheet. If more than 0.50 mil is applied, some of the adhesive when heated to seal the two sheets is absorbed into the pores and interferes with the diffusive properties.

The sheet 4 is preferably a clear non-porous impermeable plastic such as a polyester preferably about 0.002 inch thick and is bonded to the membrane sheet 2 with a thermoplastic adhesive 5 as described above. Prior to bonding, patterns of holes 6 or slots 7, or other geometric perforations may be cut into the sheet so that the materials used in the evaluations can be applied directly to the exposed portions of sheet 2.

In forming the laminated sheet in a preferred operation, a base sheet 1 of indefinite length is coated with adhesive 3 as with a doctor device to, say, 0.35 mil thickness and the coated surface is led into contact with a moving porous membrane sheet 2, also of indefinite length. The thin plastic sheet 4 of indefinite length, also coated with an adhesive about 0.35 mil thick is led into contact with the opposite side of sheet 2. The superposed sheet as a sandwich is fed over an endless metal belt and between the belt and a heated press roller which heats the laminated sheet to about 250° F. for about 1.5 minutes at a pressure of about 60 p.s.i.g. This operation effectively seals the three sheets together without plugging or impairing the pores.

The lamination of impermeable sheet 1 and film sheet 4 to both surfaces of the microporous membrane 2 serves to block passage of liquid to or from these faces. Liquid is, however, free to diffuse freely through the porous structure of membrane 2 between the laminated interfaces. Through the openings cut in the top thin laminating sheet, liquids can be introduced for controlled migration processes such as diffusion, chromatography, or electrophoresis. The top covering lamination prevents evaporation of any components from the microporous membrane sheet 2 at any point save at the openings in the top sheet 4.

The use of this laminated sheet in suitable strip dimensions may be illustrated by the technique of immunoelectrophoresis. The top flexible sheet 4 is a little shorter than the overall length of the laminated strip as shown in FIG. 1 such that either end of the porous membrane sheet 2 is exposed for contact with electrodes that are required in the electrophoretic migration. When such a strip is used in a device such as that of our said application, the ends are immersed in a buffer solution and the ends are placed in contact with the electrodes. The strip may also be first stood on edge in a shallow tray or buffer solution. Since the microporous membrane sheet is exposed at the edges of the strip, it tends to chromatograph or wick up between the two impermeable sheets. When the strip is thoroughly permeated with the buffer solution, one microliter of serum sample is applied to the cellulose acetate through the center hole 6 in the sheet 4. The strip is placed in an electrophoresis cell and a voltage is applied at the ends of the strip. The serum runs between the two impermeable sheets during migration and in a direction parallel to the long dimension of the strip. The serum sample is allowed to electrophorese until a suitable separation has been obtained.

After electrophoresis has been carried on for a suitable length of time, the strip is removed from the cell. An appropriate amount of anti-serum is applied uniformly in each of the long troughs 7. For most commercial anti-sera we have found the optimum amount applied to each trough to be approximately 40 microliters. This quantity will, of course, vary with the strength of the anti-sera, the amount of serum sample applied in the center hole 6, and other particulars of the separation. We have found that in applying the anti-serum to the troughs with a hypodermic syringe we can obtain a sufficiently uniform concentration of anti-serum along the lengths of the troughs. Having applied the anti-serum in this fashion, the strip is immediately placed in a saturated humidity chamber, to prevent evaporation from those exposed faces of the membrane sheet 2. Diffusion of the serum components and anti-serum components toward one another begins and is allowed to continue for a suitable amount of time, generally 24 to 48 hours. During this time, precipitin arcs 8 begin to form where components of the serum and anti-serum react with one another. Since serum and anti-serum are relatively colorless, these precipitin arcs are not visible through the transparent top sheet 4.

At the end of the diffusion period, the strip is removed from the incubation chamber. With a sharp object, one corner of sheet 4 is lifted so that one can grasp the tab between his fingers and peel it off the membrane sheet. The flexible sheet 4 is pulled backward at a sharp angle so that the stresses of peeling are concentrated at the adhering interface between the sheet 4 and the membrane sheet 2. As a result, the relatively delicate cellulose acetate of which sheet 2 is composed remains uniformly in place rather than being peeled away with the sheet 4. If a thicker sheet were used for the thin flexible sheet 4, the desired peeeling might not occur or might become irregular with chunks of cellulose acetate being torn away with the stiffer sheet.

After stripping, the whole face of the cellulose acetate membrane is exposed. Precipitin arcs such as those shown in FIG. 1 reside within the porous matrix of the cellulose acetate membrane as well as unreacted serum and anti-serum components. These unreacted components are first rinsed out of the cellulose acetate membrane by immersing it in warm saline. The porosity of the microporous membrane facilitates a much faster wash out of these unreacted components than is possible with gel structures used for immunoelectrophoresis. One or two hours suffice for a complete wash-out of unreacted components.

The washed strip is then placed into a staining solution that will stain the precipitated protein. The strip is stained for a time sufficient for binding of dye molecules to the protein complexes. This may be anywhere from a few minutes to several hours, depending on the particular stain used.

Following staining, the strip is rinsed in an appropriate rinsing medium. Dye molecules which did not bind to the protein rinse free of the microporous membrane sheet, leaving the distinctive pattern of the precipitin arcs against a relatively clear white background of the cellulose acetate membrane. If it is desired, the strip can be transparentized in a manner similar to that used for densitometry of the two-component laminate of said application. The precipitin arcs, however, have an extremely fine structure and the loss of resolution attendant with the clearing process is neither necessary nor desirable. Because of this, immunoelectrophoresis patterns are generally not transparentized but are viewed directly.

Although the immediate application for the laminated sheet of the invention is in the area of immunoelectrophoresis and immunodiffussion it has other analytical uses such as for other diffusional processes or chromatographic processes. For example, certain areas of the microporous plastic membrane could be impregnated with specific chemical reagents before the top plastic sheet is laminated on. Substances chromatographed through the plastic membrane could be made to pass through these impregnated layers, thus developing reactions, colors, or appropriate indications. By blocking certain areas within the porous plastic membrane one could define the diffusional migration paths.

There are a variety of impermeable sheets or films and adhesive materials that can be used in forming this laminated sheet structure. As pointed out above, the use of a thin flexible plastic sheet for one lamination and a thick, relatively rigid sheet for the other lamination, presents an advantage in controlling the peeling fracture when the thin sheet is removed. Although some cellulose acetate as a very thin skin adheres to the thin sheet this does not impair the effectiveness of the major body of cellulose acetate remaining in bonded contact with the plastic base sheet.

We claim:

1. The laminated sheet for evaluating diffusive reactions which comprises a non-porous base sheet of plastic which is flexible but stiff enough to be self-supporting, a microporous plastic membrane sheet having a multiplicity of small pores in bonded connection with one side of the base sheet and a very thin flexible non-porous sheet in bonded connection with the opposite side of the membrane sheet, said flexible sheet having at least one localized openning through which the membrane sheet and a multitude of adjacent pores thereof are exposed.

2. The laminated sheet as defined in claim 1 in which the base sheet is sufficiently resilient that it can maintain itself in a bowed position in a testing device.

3. The laminated sheet as defined in claim 1 in which the base sheet and the thin flexible sheet are bonded to the porous plastic membrane sheet with a thermoplastic adhesive which engages the solid portions of the porous plastic membrane sheet leaving a very substantial proportion of the pores open for receiving liquid.

4. The laminated sheet as defined in claim 1 in which the pores of the plastic membrane sheet have an average diameter of from 0.5 to 1.5 microns and are substantially open for receiving a liquid specimen to be tested.

5. A laminated sheet as defined in claim 1 in which the base sheet is a polyester about 10 mils thick and the adhesive is not over 0.50 mil thick, and the thin flexible sheet is also a polyester about 0.002 inch thick.

6. The laminated sheet as defined in clami 1 in which the porous plastic membrane sheet is formed of cellulose acetate.

7. A laminated sheet in the form of a strip which comprises a non-porous plastic base sheet which supports the strip, a microporous plastic membrane sheet having one side in bonded connection with the base sheet, and a flexible non-porous impervious top sheet removably bonded to the opposite side of the plastic membrane sheet, said top sheet having an approximate thickness of 0.002 inch whereby the flexible sheet can be peeled off at a sharp angle to effect severance from the microporous plastic membrane without removing and impairing amounts of said membrane.

8. A laminated strip as defined in claim 7 in which the porous plastic membrane is formed essentially of cellulose acetate having pores averaging from 0.5 to 1.5 microns, and the thin flexible sheet has one or more localized openings through which the plastic membrane and a multitude of adjacent pores are exposed.

9. A laminated strip as defined in claim 7 in which a thermoplastic adhesive bonds the base and thin flexible sheets to the porous membrane sheet.

10. A laminated strip as defined in claim 7 in which the thin flexible sheet is shorter than the porous membrane sheet leaving end portions thereof exposed for electrical connections.

References Cited

UNITED STATES PATENTS

| | | | |
|---|---|---|---|
| 3,230,162 | 1/1966 | Gilchrist | 204—180X |
| 3,378,481 | 4/1968 | Saravis et al. | 204—299 |
| 3,405,206 | 10/1968 | Abell et al. | 156—247 |

ROBERT F. BURNETT, Primary Examiner

W. A. POWELL, Assistant Examiner

U.S. Cl. X.R.

156—247, 252; 161—160, 406; 204—180; 210—198